US011404917B2

(12) United States Patent
Sounas et al.

(10) Patent No.: US 11,404,917 B2
(45) Date of Patent: Aug. 2, 2022

(54) METAMATERIAL REFLECTORS FOR RADIO-FREQUENCY WIRELESS POWER TRANSFER

(71) Applicant: Wayne State University, Detroit, MI (US)

(72) Inventors: Dimitrios Sounas, Detroit, MI (US); Zahra Katbay, Dearborn, MI (US); Mohammed Ismail Elnaggar, Dearborn, MI (US)

(73) Assignee: Wayne State University, Detroit, MI (US)

( * ) Notice: Subject to any disclaimer, the term of this patent is extended or adjusted under 35 U.S.C. 154(b) by 0 days.

(21) Appl. No.: 17/443,627

(22) Filed: Jul. 27, 2021

(65) Prior Publication Data
US 2022/0037930 A1    Feb. 3, 2022

Related U.S. Application Data

(60) Provisional application No. 63/057,954, filed on Jul. 29, 2020.

(51) Int. Cl.
*H02J 50/23* (2016.01)
*H02J 50/90* (2016.01)
*H02J 50/27* (2016.01)
*H02J 50/40* (2016.01)

(52) U.S. Cl.
CPC ............ *H02J 50/23* (2016.02); *H02J 50/27* (2016.02); *H02J 50/402* (2020.01); *H02J 50/90* (2016.02); *H02J 2310/12* (2020.01)

(58) Field of Classification Search
CPC .......... H02J 50/23; H02J 50/27; H02J 50/402; H02J 50/90; H02J 2310/12; H02J 50/005
See application file for complete search history.

(56) References Cited

U.S. PATENT DOCUMENTS

| 10,211,674 B1 | 2/2019 | Leabman et al. | |
| 2017/0141582 A1* | 5/2017 | Adolf | H02J 50/05 |
| 2018/0262040 A1* | 9/2018 | Contopanagos | H02J 7/0042 |
| 2019/0372234 A1* | 12/2019 | Lipworth | H01Q 15/002 |
| 2020/0067187 A1* | 2/2020 | Reynolds | H02J 50/23 |
| 2020/0244109 A1* | 7/2020 | Song | H02J 50/50 |

OTHER PUBLICATIONS

International Search Report dated Oct. 14, 2021 for copending International Appl. No. PCT/US2021/043301.

(Continued)

*Primary Examiner* — Daniel Cavallari
(74) *Attorney, Agent, or Firm* — Fishman Stewart PLLC (57) ABSTRACT

A system, method, and device that provides power to an electrical unit such as an Internet of Things (IoT) device that includes a transmitter that provides electrical power through electromagnetic waves, a receiver, an array that includes a plurality of metamaterial elements, such that the electrical power passes wirelessly from the transmitter to the array, and a controller that applies selective phase shifts to each of the plurality of metamaterial elements such that the electrical power is transmitted from the transmitter, reflected off the array, and is received in phase at the receiver that converts the electromagnetic waves to an electric current to power the device.

20 Claims, 8 Drawing Sheets

(56) References Cited

OTHER PUBLICATIONS

M. Shahmohammadi, M.J. Chabalko and A.P. Sample, "Circuit Model for Resonant Cavity Mode Enabled Wireless Power Transfer," Proceedings of the 46th European Microwave Conference, pp. 747-750, Oct. 4-6, 2016, London, UK.

M.J. Chabalko and A.P. Sample, "Three-Dimensional Charging via Multimode Resonant Cavity Enabled Wireless Power Transfer," in IEEE Transactions on Power Electronics, vol. 30, No. 11, pp. 6163-6173, Nov. 2015.

R.A. Moffatt, "Wireless Power Transfer by Means of Electromagnetic Radiation within an Enclosed Space:" https://arxiv.org/pdf/1611.07076, Nov. 22, 2016.

* cited by examiner

METAMATERIAL REFLECTORS FOR RADIO-FREQUENCY WIRELESS POWER TRANSFER

CROSS-REFERENCE TO RELATED APPLICATION

This application claims the benefit of U.S. Provisional Patent Application Ser. No. 63/057,954 filed on Jul. 29, 2020, the disclosure of which is hereby incorporated by reference in its entirety as though fully set forth herein.

TECHNICAL FIELD

This disclosure relates generally to metamaterial reflectors for wireless power transfer.

BACKGROUND

Wireless power transfer (WPT) technologies have attracted attention in recent years. Applications of WPT technologies can be very broad, from low-power consumer electronics, to implanted medical devices, to high-power industrial and electric vehicle applications.

Recent research efforts have focused on technologies based on magnetic coupling, as they are typically less sensitive to surrounding objects and safer for humans, and often more suitable for the increasing demands for wireless charging of electronic devices.

One form of WPT is based on radiative fields for transfer of power over large distances. The viability of an unexplored form of wireless power transfer has been demonstrated based on resonant cavity modes of an enclosed structure. That work aims to provide wireless power anywhere in a confined three-dimensional volume of space, including locations where magnetic-based WPT is not typically possible, and is accomplished by stimulating natural electromagnetic resonant modes of a metallic structure with low level electromagnetic fields, so that energy can be efficiently coupled to a small receiver placed within the structure.

In the same context it has been shown that the presence of a reflecting plane may allow the efficiency of wireless power transfer to be enhanced, and a situation has been explored in which both the transmitter and receiver are completely enclosed by reflecting walls, such that the presence of reflected walls enhances the power transfer system efficiency.

Although WPT technique has made it possible to enhance the efficiency even at large distances, it is limited to receiver locations where the electromagnetic waves from the source and the reflectors add up constructively with each other. As a result, WPT efficiency changes dramatically when the receiver is moved from one location to another.

The Internet of Things (IoT) is becoming widely known and connects a wide range of ambient devices to collaborate with one another and is a promising foundation for the era of smart environments. The potential impact of IoT is not limited to enhancing convenience in daily life: it has the potential to upend the structure of industry, economy, healthcare, and so on, by connecting various physical phenomena through the internet. The design of energy-efficient solutions aimed at achieving a low current consumption and creating a green society is critical to the effective deployment of IoT technologies.

The growth of IoT has resulted in a major increase in the number of connected devices in our homes, workplaces, and industrial spaces that stream data. The costs of actively maintaining and repairing batteries become prohibitive at scale as the number of these devices rises. Attempting to make devices work at ultra-low power levels (e.g., microWatt order) and powering them via microwave power transfer or RF energy harvesting is one emerging counterpart.

The WPT technique may be an ideal technical solution, particularly for smart home applications, to electrically energize devices within specific areas, due to its remarkable characteristics of flexibility, position-free, and mobility. Furthermore, in indoor rich scattering environments, which are the most desired application scenarios for wireless energy transfer, WPT schemes may fail because the line-of-sight link may be blocked by impenetrable objects or attenuated by penetration loss.

The challenge for such a WPT system is to be able to wirelessly charge a remote device in a non-line of sight environment while utilizing multipath signals, if they exist, as a useful resource for wireless power transfer. In this regard, if the power of each multipath can be constructively recollected, it is possible to sustain the receiver with a higher harvested power level.

Previous WPT systems lack efficient power transfer with devices that are not in direct line-of-sight of a power transmitter. Similarly, WPT systems lack efficient power transfer with devices that are not stationary. Therefore, a need exists for improved systems, methods, and apparatuses for WPT techniques for powering or charging IoT devices with flexibility, position-free, and mobility characteristics.

BRIEF DESCRIPTION

The disclosure is directed toward a method, system, and apparatus for enhancing wireless power transfer efficiency to a receiving antenna to meet the demand of harvesting wireless energy to charge or power up multiple devices at the same time.

According to one aspect, a system that provides power to a device includes a transmitter that provides electrical power through electromagnetic waves, a receiver, an array that includes a plurality of metamaterial elements, such that the electrical power passes wirelessly from the transmitter to the array, and a controller that applies selective phase shifts to each of the plurality, of metamaterial elements such that the electrical power is transmitted from the transmitter, reflected off the array, and is received in phase at the receiver that converts the electromagnetic waves to an electric current to power the device.

According to another aspect, a method of providing power to a device includes positioning a transmitter that provides electrical power through electromagnetic waves at a location, positioning a receiver at a location, positioning an array that includes a plurality of metamaterial elements proximate the location, such that the electrical power passes wirelessly from the transmitter to the array, and positioning a controller proximate the array that applies selective phase shifts to each of the plurality of metamaterial elements such that the electrical power is transmitted from the transmitter, reflected off the array, and is received in phase at the receiver that converts the electromagnetic waves to an electric current to power the device.

According to another aspect, a device for reflecting electrical power to a receiver that includes an array including a plurality of metamaterial elements and a controller that applies a selective phase shift to each of the plurality of metamaterial elements, such that the electrical power is reflected off the array and is received in phase at a receiver to power a device.

Various other features and advantages will be made apparent from the following detailed description and the drawings. For example, it will be apparent by the disclosure that the method, system, and apparatus disclosed could be used in various other contexts including wireless charging of Internet of Things (IoT) devices, whether stationary or moving, and in a variety of different environments, or charging electric vehicles.

DETAILED DESCRIPTION

System, method, and apparatus of the disclosed examples are described with respect to wirelessly transferring power to a device in an enclosed room using an array of metamaterial elements to reflect power waves towards a receiving device for optimal power absorption. Examples are described with respect to powering a device in an enclosed room, however it is contemplated that the disclosed examples are applicable to other contexts as well, and may be used for powering devices in buildings or open spaces, as well as powering a variety of IoT devices or charging electric vehicles.

Disclosed is a system, method, and device for using transmitting antennas and metamaterial elements distributed at the walls of a room to enhance the power transfer efficiency to a receiving antenna instead of using transmitting and receiving coils like in the majority of presented works in this area, where they use metamaterials as a lens or they add metamaterial slabs between the transmitting and receiving coils to enhance the power transfer efficiency over a limited distance.

A metamaterial is any material engineered to have a property that is not found in naturally occurring materials and may include such properties as a negative phase velocity or a negative refractive index. Typically, a metamaterial is made from assemblies of multiple elements fashioned from composite materials such as metals and plastics. The materials are usually arranged in repeating patterns, at scales that are smaller than wavelengths of a phenomena they may influence. Metamaterials derive their properties not from the properties of the base materials, but from a newly designed structures. A precise shape, geometry, size, orientation, and arrangement yields smart properties capable of manipulating electromagnetic waves: by blocking; absorbing; enhancing; or bending waves, as examples, to achieve benefits that go beyond what is possible with conventional materials.

Figure 1A:
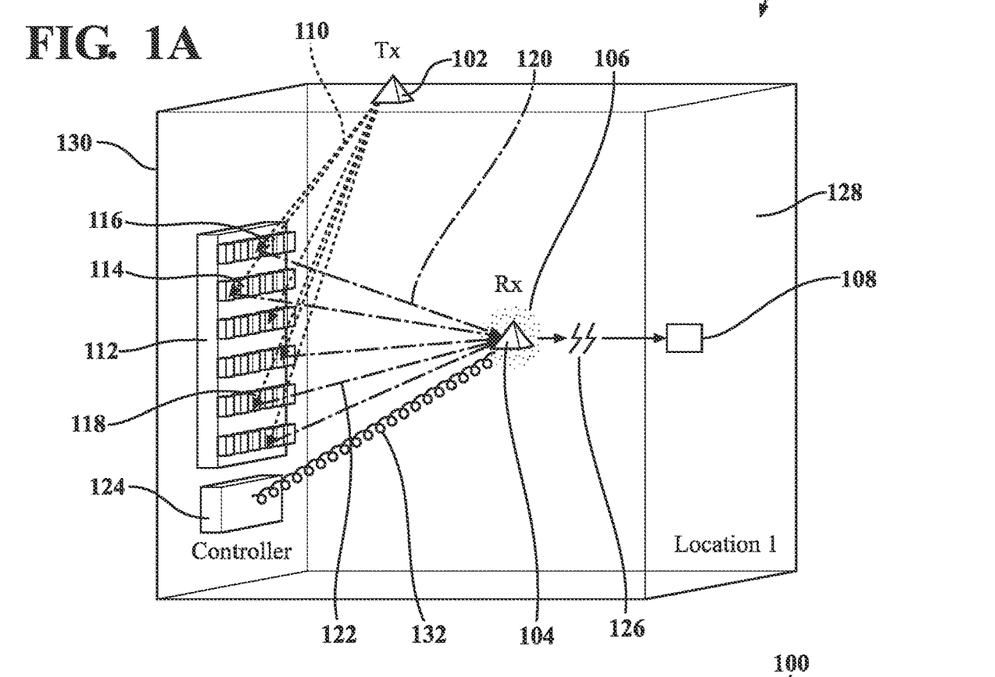
FIG. 1A illustrates a power transmission scenario in a room having dynamic reflectors to adjust the phase of reflected waves, with a Rx positioned at a first location.
Figure 1B:
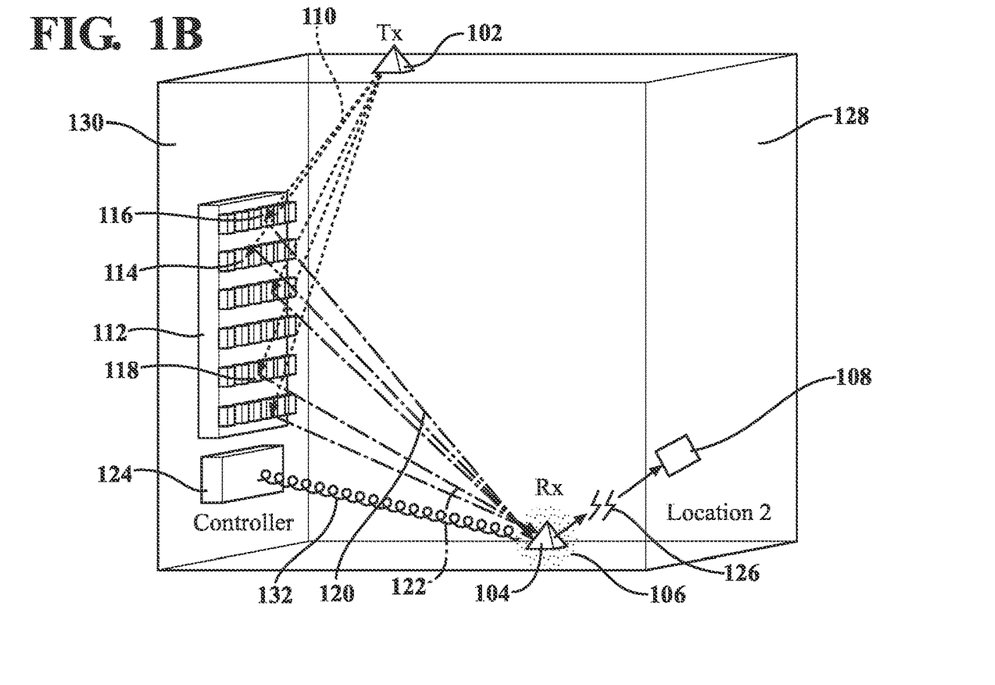
FIG. 1B illustrates a power transmission scenario in a room having dynamic reflectors to adjust the phase of reflected waves, with a Rx positioned at a second location.

Thus, according to the disclosure and referring to FIGS. 1A and 1B, a system 100 that provides power to a device 108 includes a transmitter 102, illustrated as "Tx" in the figures as shorthand, that provides electrical power through electromagnetic waves 110, a receiver 104, illustrated as "Rx" in the figures as shorthand, an array 112 that includes a plurality 114 of metamaterial elements 116, 118, such that electromagnetic waves 110 pass wirelessly from transmitter 102 to array 112, and a controller 124 applies selective phase shifts to plurality 114 of metamaterial elements 116, 118, such that electromagnetic waves 110 are transmitted from transmitter 102, reflected as reflected waves or signals 120, 122 off of array 112, and are received in phase at receiver 104 that converts reflected waves 120, 122 to an electric current 126 to power device 108.

FIGS. 1A and 1B show array 112 with a plurality 114 of metamaterial elements 116, 118 positioned to adjust the phase of the electromagnetic waves 110 in time, depending on the location of receiver 104, so that reflected signals 120, 122 arrive at a proximate location 106 of receiver 104 in phase with each other. For system 100, a controller 124 is disclosed, where plurality 114 of metamaterial elements 116, 118 adjust their phases depending on a signal 132 emitted by receiver 104. In one example, receiver 104 emits signal 132 to controller 124 indicating receivers 104 proximate location 106 in room 128. Controller 124 applies a selective phase shift to plurality 114 of metamaterial elements 116, 118 such that metamaterial elements 116, 118 reflect electromagnetic waves, illustrated as reflected waves 120, 122, to be in phase with each other at proximate location 106 of receiver 104. FIGS. 1A and 1B show array 112 of plurality 114 metamaterial elements 116, 118 on one wall 128 for illustration purposes only, but in general metamaterial elements 116, 118 are placed on any wall 128 in room 130.

FIG. 1A shows a first arrangement with transmitter 102 and receiver 104 positioned within room 128, and plurality 114 of metamaterial elements 116, 118 positioned in array 112 along one exemplary arrangement and on wall 130 of room 128 in which all are positioned. FIG. 1B shows a second arrangement with receiver 104 positioned at a second location within room 128. Plurality 114 of metamaterial elements 116, 118 change phase and direction of reflected waves 120, 122 to be directed to and in phase with each other at location of receiver 104.

Figure 2:
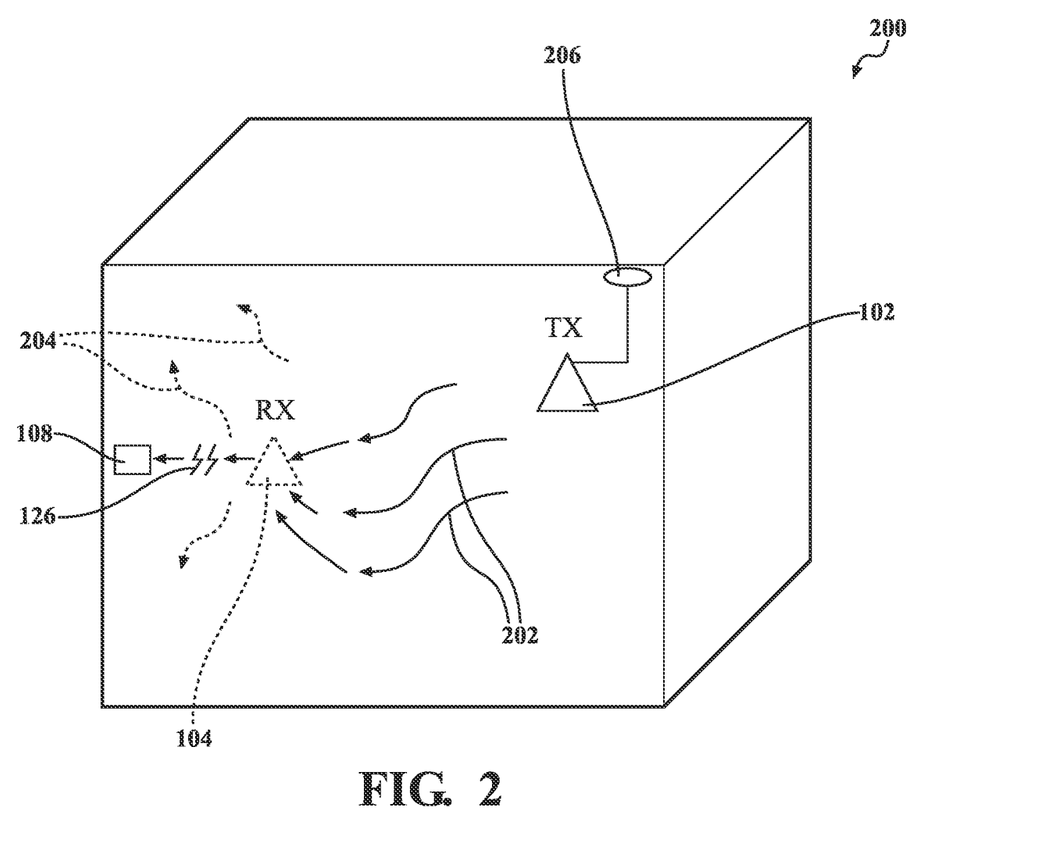
FIG. 2 illustrates power transmission from a transmitter (Tx) to a receiver (Rx) without the presence of reflecting walls.

As shown in FIG. 2, a prior system 200 is illustrated with transmitter 102 and receiver 104 positioned inside room 128. Room 128 in this example does not include reflecting walls. Transmitter 102 sends power via electromagnetic energy through incident waves 202 toward receiver 104.

Incident waves 202 may be radio frequency electromagnetic signals. The frequency of signals used in system 200 may vary depending on the type of transmitter 102 and receiver 104 utilized in system 200. For instance, a frequency of 900 MHz may be used to avoid interferences with other wireless standards such as Wi-fi and Bluetooth. Receiver 104 is treated as a lossy scatterer, so when incident waves 202 arrive at receiver 104, only part of incident waves 202 are absorbed and the rest are scattered in different directions. Scattered waves 204 are sent into free space away from receiver 104. Transmitter 102 may be any apparatus connected to a source of power 206 which converts the power to electromagnetic energy in the form of incident waves 202, such as a dipole antenna. Receiver 104 may be any device 108 that receives the power via incident waves 202 and converts incident waves 202 to an electric current 126 such as DC or AC to be utilized by device 108. Receiver 104 harvests the energy from system 200 to charge or power device 108, for example an IoT device or an electrical vehicle.

Figure 3:
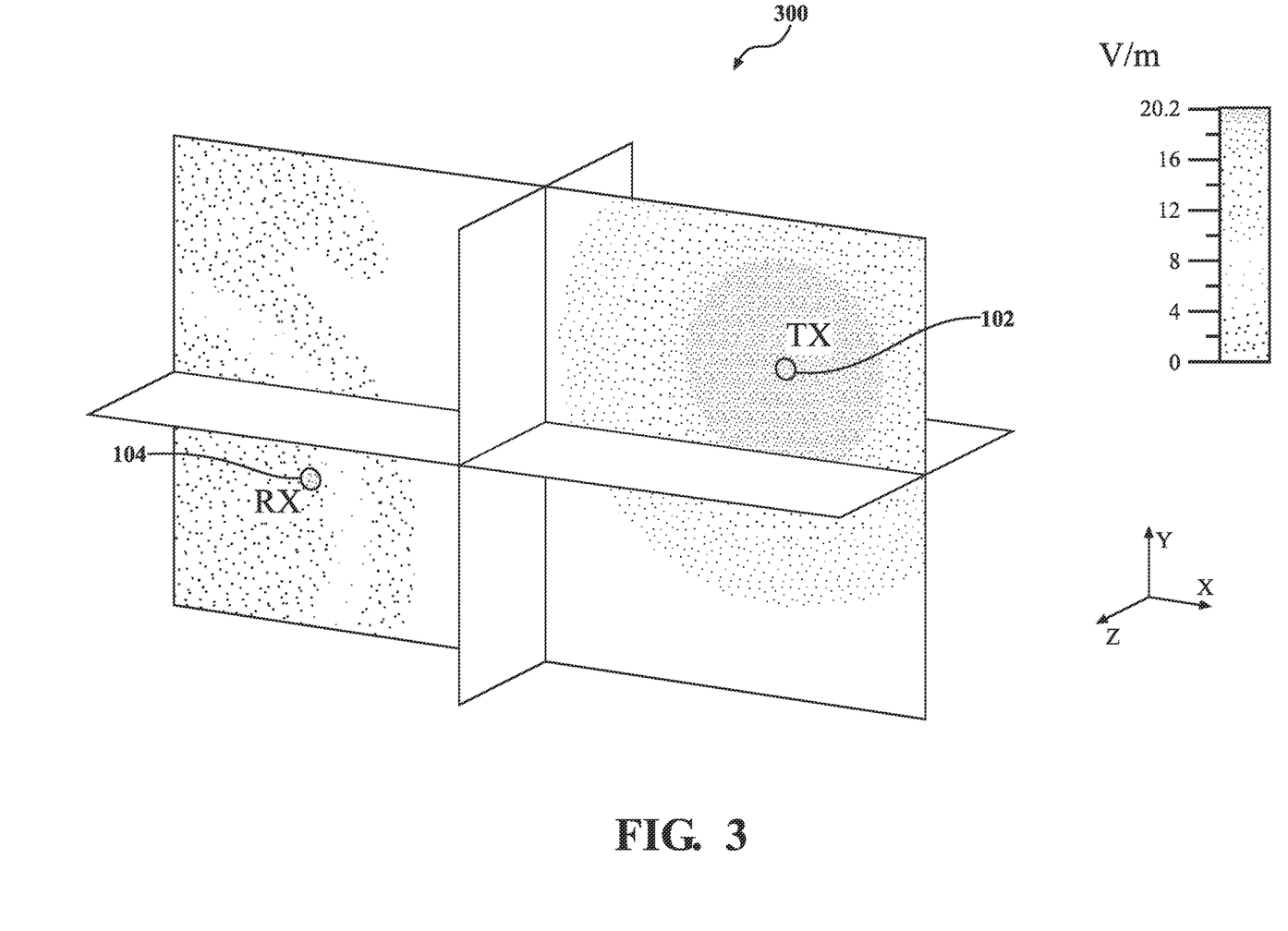
FIG. 3 illustrates exemplary electric field intensity in a room while transmitting power from a Tx to a Rx without reflecting walls.

As the power propagates from transmitter 102 to receiver 104, incident waves 202 also get attenuated due to spreading in space (shown in FIG. 3). Because only some of the already attenuated incident waves 202 are absorbed by receiver 104, the amount of received power is small which indicates low system efficiency as most of the transmitted power is lost in space due to spreading and scattering. FIG. 3 illustrates the electric field distribution 300 inside room 128 without reflecting walls. The electric field intensity decreases at a certain distance from transmitter 102 and as a result, only a small fraction of transmitted power reaches receiver 104 and the majority of the radiated power is lost in free space.

Figure 4:
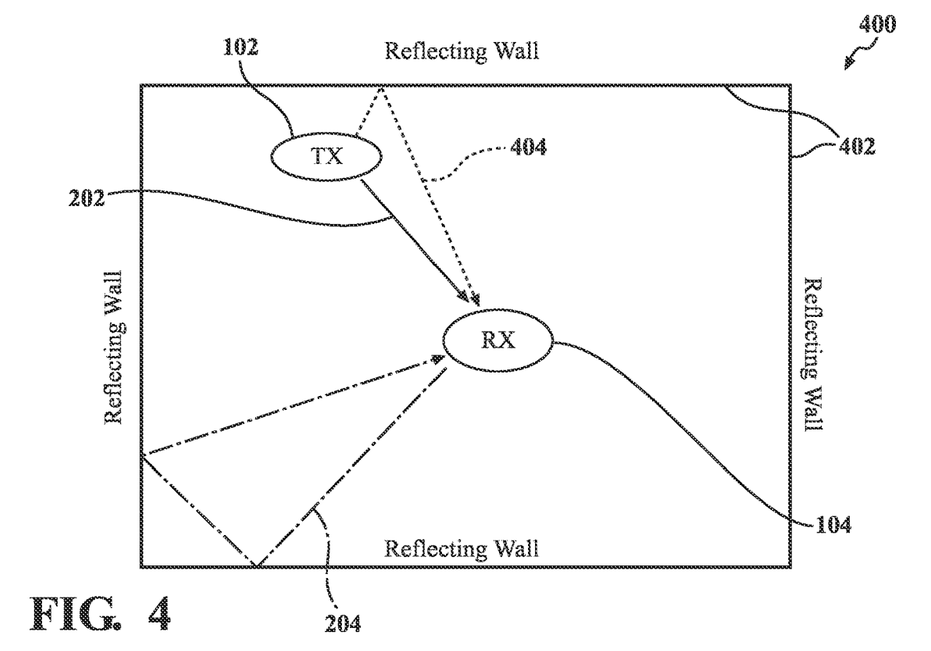
FIG. 4 illustrates a power transmission scenario from a Tx to a Rx in the presence of reflecting walls.

To compensate for the power loss, and to enhance the power transfer efficiency, transmitter 102 and receiver 104 are enclosed in room 128 with reflecting; walls 402. FIG. 4 represents a power transmission scenario 400 when transmitter 102 and receiver 104 are enclosed with reflecting walk 402. In scenario 400, power may be transmitted to receiver 104 in at least one of three different ways. Transmitter 102 can send incident wave 202 directly to receiver 104, Transmitter 102 can send a reflected incident wave 404, which does not originally get transmitted in the direction of receiver 104 and is instead reflected off reflecting walk 402 prior to arriving at receiver 104. Transmitter 102 may send incident waves 202 to receiver 104 and receiver 104 scatters incident waves 104 instead of absorbing them. Scattered wave 204 will now reflect off reflecting wall 402 and be reflected to receiver 104 instead of being lost in free space. Power received at receiver 104 will eventually sum up with the incident power, thereby on average increasing the amount of received power. With reflecting walls 402 and the fact that in such a scenario 400 the power that is not originally captured by receiver 104 will be reflected to receiver 104 by reflecting walls 402, transfer efficiency is increased.

However, to have maximum efficiency enhancement, waves 202, 204, 404 received at receiver 104 need to have the same phase when they reach receiver 104 after reflecting off walls 402. Generally, this condition is only satisfied at a limited number of locations inside a room, imposing restrictions on the location of receiver 104. Reflection of waves 404, 204 off reflecting walls 402 results in hotspots where waves 404, 204 are in phase with each other. Cold spots around the room are found where waves 404, 204 are not in phase with each other, resulting in decreased system efficiency, especially if full coverage of a room or mobility of a device is desired.

To avoid this problem, and according to the disclosure, metamaterial elements are added to the walls of the room that are capable of shifting the phase of the electromagnetic waves to allow for mobility of the receiver.

Figure 5:
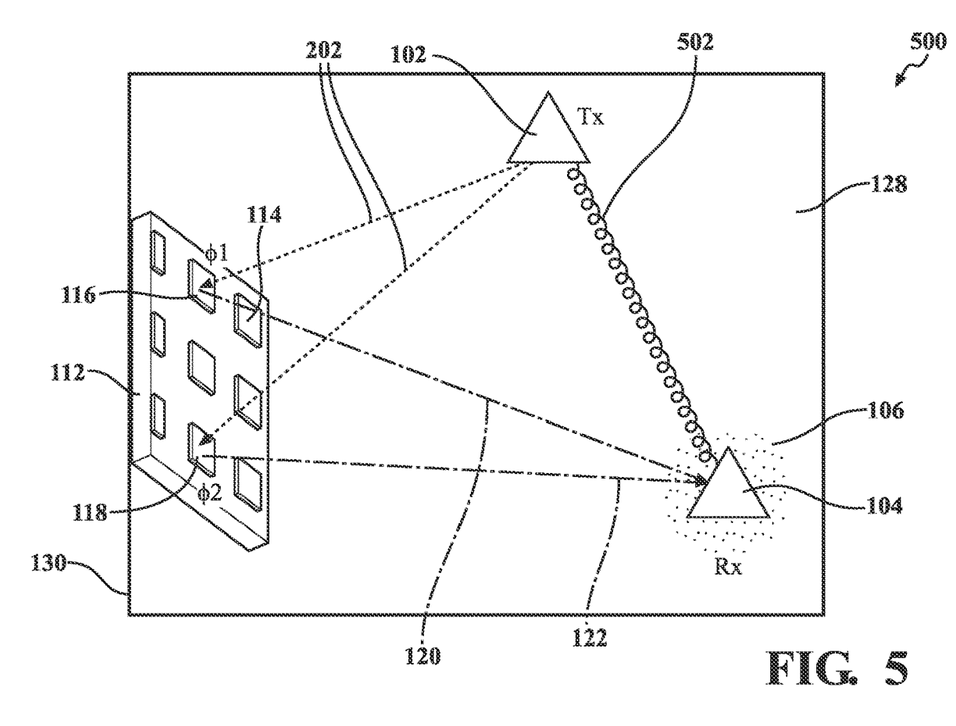
FIG. 5 illustrates a power transmission from a Tx to a Rx in the presence of an array with metamaterial elements.

As shown in FIG. 5, a scenario 500 is illustrated where a plurality 114 of dynamic metamaterial elements 116, 118 are added to wall 130 to adjust the phase of incident waves 202 in time, depending on proximate location 106 of receiver 104, so that reflected waves 120, 122 arriving at receiver 104 are in phase with each other. Receiver 104 sends a pilot signal 502 to transmitter 102 to instruct transmitter 102 to begin transmission of electrical power via incident waves 202. FIG. 5 illustrates one receiver 104 in room 128, however it is noted that any number of receivers may be located in room 128 and powered at the same time. Each receiver 104 in room 128 may have a unique pilot signal 502 to differentiate each receiver 104 and their proximate location 106 and need for power between multiple receivers. FIG. 5 illustrates pilot signal 502 directed to transmitter 102, but it should be noted that pilot signal 502 may be emitted in all directions. Particularly, pilot signal 502 may be sent to array 112 of plurality 114 of metamaterial elements 116, 118 (as show in FIG. 1 as signal 132). Signal 132 may allow array 112 to determine proximate location 106 of receiver 104 and where to focus incident waves 202 and reflected waves 120, 122. Once transmitter 102 receives pilot signal 502, transmitter 102 sends incident waves 202 to array 112 located on wall 130 of room 128. Array 112 includes plurality 114 of metamaterial elements 116, 118 which reflect incident waves 202. Array 112 adjusts plurality 114 of metamaterial elements 116, 118 to adjust phase and direction of reflected waves 120, 122 based on signal 132 which indicates proximate location 106 of receiver 104.

A first metamaterial element 116 adjusts the phase of incident wave 202, while a second metamaterial element 118 adjusts for a different phase of incident wave 202. Plurality 114 of metamaterial elements 116, 118 are adjusted individually so that reflected waves 120, 122 are in phase with each other at proximate location 106 of receiver 104 for maximum power density and absorption by receiver 104. Controller 124 (shown in FIGS. 1A & 1B) adjusts the phase of plurality 114 of metamaterial elements 116, 118 based on signal 132 emitted by receiver 104.

Proximate location 106 of receiver 104 includes an area of varying size surrounding the actual location of receiver 104. The size of proximate location 106 of receiver 104 may change due to a variety of variables. For instance, proximate location 106 of receiver 104 may be smaller in area due to the presence of more metamaterial elements being able to focus reflected waves 120, 122 more directly. Proximate location 106 of receiver 104 may be larger due to less metamaterial elements focusing reflected waves 120, 122 less directly, FIG. 5 shows one array 112 on one wall 130 for illustration purposes only, but in general an array 112 of a plurality 114 of metamaterial elements 116, 118 may be placed on any wall 130 in room 128 and room 128 may include any, number of arrays 112. Array 112 may also include any number of metamaterial elements.

FIG. 5 illustrates receiver 104 at one location, however receiver 104 may move throughout room 128. Pilot signal 502 indicates change in location of receiver 104. Array 112 of plurality 114 of metamaterial elements 116, 118 changes the phase of plurality 114 of metamaterial elements 116, 118 based on the location of receiver 104 throughout room 128.

This results in reflected waves 120, 122 being adjusted to be in phase with each other at proximate location 106 of the receiver 104 as receiver 104 moves. Therefore, the location of maximum power density will move with receiver 104.

Figure 6:
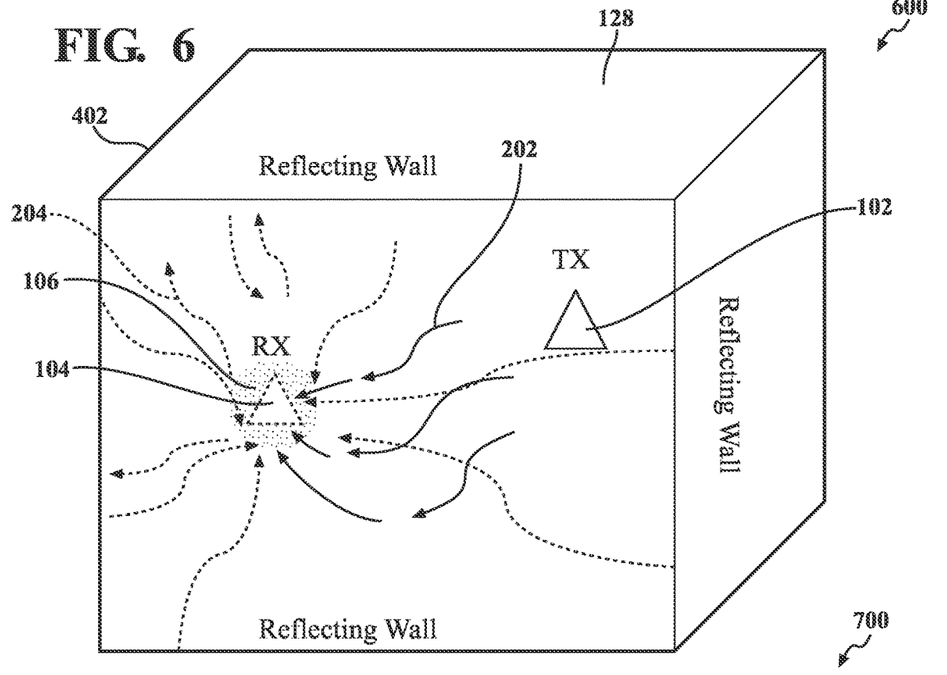
FIG. 6 illustrates a power transmission scenario in the presence of reflecting walls in an enclosed space with one Tx.

As shown in FIG. 6, a scenario 600 is illustrated with one transmitter 102 in room 128 with reflecting walls 402. Transmitter 102 sends incident waves 202 towards proximate location 106 of receiver 104. At least some of incident waves 202 are absorbed by receiver 104. The remaining waves are scattered throughout room 128 as scattered waves 204. Surrounded by reflecting walls 402, scattered waves 204 are reflected towards receiver 104 when scattered waves 204 reach reflecting wall 402. Eventually scattered waves 204 are absorbed by receiver 104 and will match the power sent in incident waves 202. Without array 112 with plurality 114 of metamaterial elements 116, reflecting walls 402 do not adjust the phase of reflected signals based on location of receiver 104. Decreased system efficiency occurs without ensuring reflected signals are in phase with each other at location of receiver 104.

Figure 7:
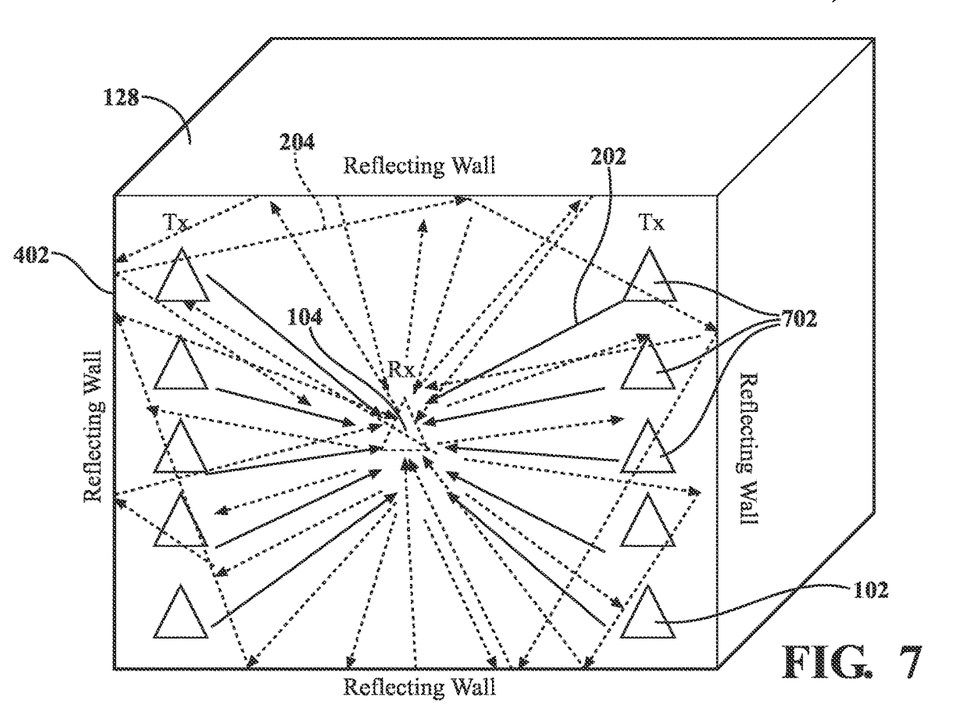
FIG. 7 illustrates a power transmission scenario in the presence of reflecting walls in an enclosed space with more than one Tx.

The addition of more transmitters may increase system efficiency. FIG. 7 illustrates a scenario 700 with a plurality 702 of transmitters 102. If more than one transmitter 102 is positioned within room 128, the overall power that can be transmitted to receiver 104 is increased. Plurality 702 of transmitters 102 will send more incident waves 202 towards receiver 104, resulting in more incident waves 202 being absorbed by receiver 104, and more scattered waves 204 being reflected off reflecting walls 402 back towards receiver 104. Thus, system efficiency improves slightly and saturates room 128 as the number of transmitters 102 increases. FIG. 7 is illustrated in a room with reflecting walls 402, but without array 112 of plurality of metamaterial elements 116, 118. As illustrated, scenario 700 may experience sub-optimal power efficiency as the reflected waves are not adjusted to be in phase with each other at proximate location 106 of receiver 104. While the addition of transmitters may increase absorbed power slightly with the addition of more incident waves that can be absorbed, overall system efficiency and recapture of power is low because the phase of the waves are not adjusted for recapture at proximate location of receiver.

Figure 8A:
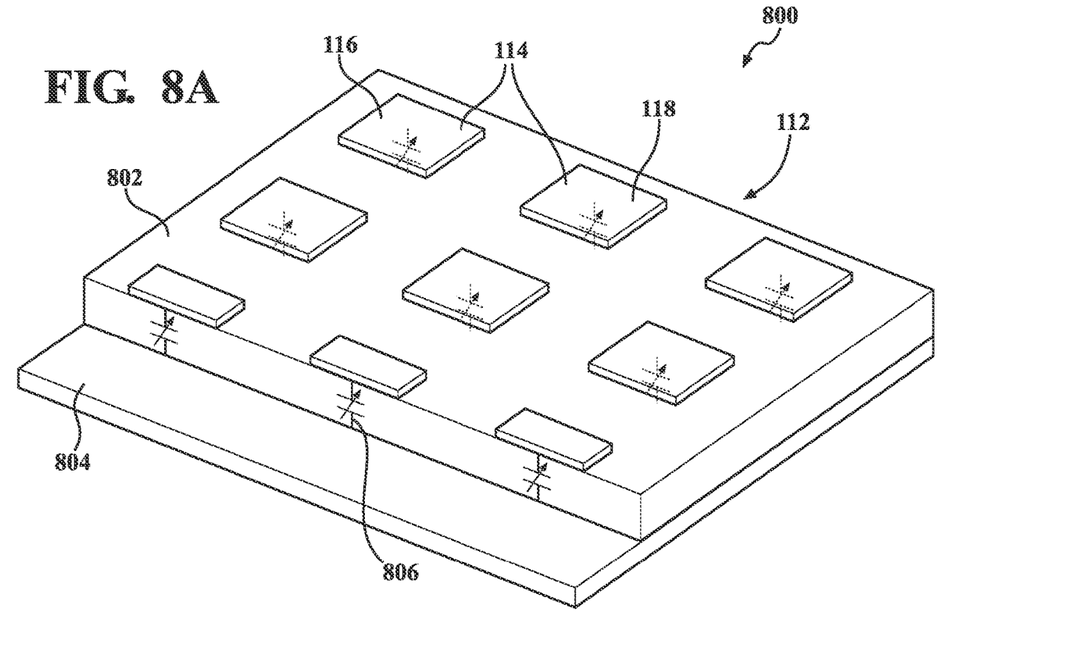
FIG. 8A illustrates a metamaterial reflector that includes an array of antenna elements, each of which is loaded with a variable capacitor connected between the antenna elements and the ground plane.
Figure 8B:
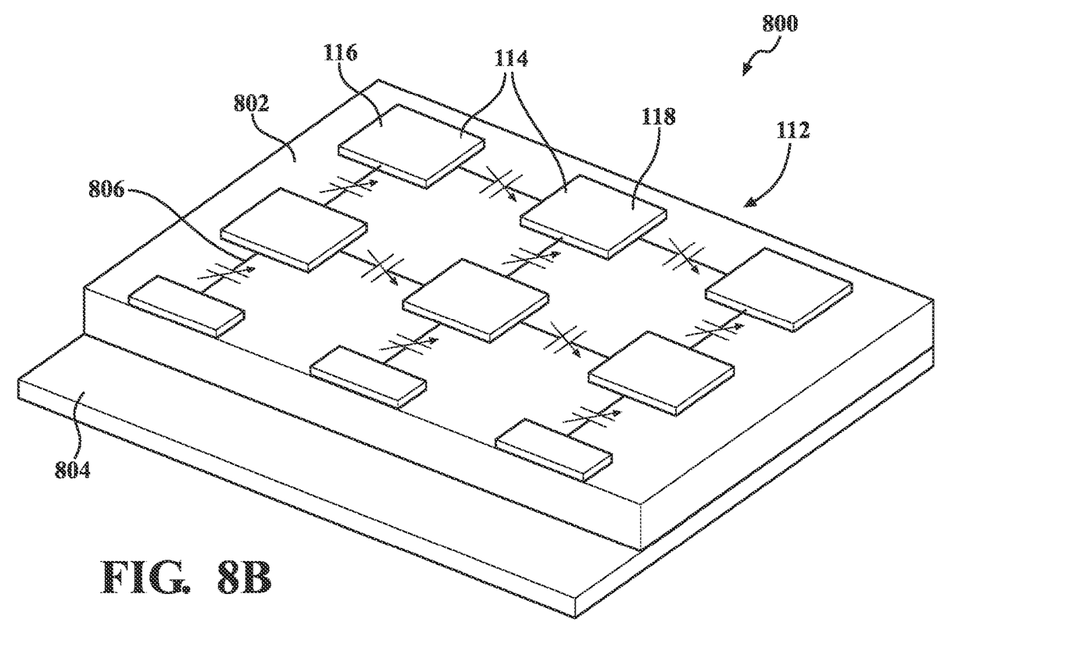
FIG. 8B illustrates a metamaterial reflector that includes an array of antenna elements, each of which is loaded with a variable capacitor connected between the antenna elements.

Examples of array 112 are illustrated in FIGS. 8A and 8B. Apparatus 800 for reflecting electrical power to receiver 104 includes array 112 that includes plurality 114 of metamaterial elements 116, 118 and controller 128 (shown in FIGS. 1A and 1B) that applies a selective phase shift to plurality 114 of metamaterial elements 116, 118, such that electrical power, illustrated as incident wave 202, is reflected off array 112 and is received in phase at receiver 104 to power device 108.

Each array 112 is a two-dimensional array 112 of plurality 114 metamaterial elements 116, 118. Plurality 114 of metamaterial elements 116, 118 acts as antennas, such as metallic patch antennas placed top of a dielectric substrate 802. A metallic ground plane 804 is placed at the back of dielectric substrate 802. In one possibility, each metamaterial element 116, 118 is loaded with a variable capacitor 806 from metallic ground plane 804 as shown in FIG. 8A. Variable capacitor 806 may be a varactor or a bank of capacitors and switches. In another possibility, variable capacitors 806 are connected between plurality 114 of metamaterial elements 116, 118 as shown in FIG. 8B. The capacitance of each variable capacitor 806 is controlled by an electric signal generated by the controller 124 (shown in FIGS. 1A and 1B). Variable capacitors 806 control the reflection phase of plurality 114 of metamaterial element 116, 118, so that the reflection phase is $\theta(i,j)$ for the ij-th element of array 112.

System 500 provides power to device 108, comprising transmitter 102 that provides electrical power through electromagnetic waves to receiver 104, array 112 that includes plurality 114 of metamaterial elements 116, 118, such that electrical power passes wirelessly from transmitter 102 to array 112, and controller 128 that applies selective phase shifts to each of plurality 114 of metamaterial elements 116, 118 such that the electrical power is transmitted from transmitter 102, reflected off of array 112, and is received in phase at receiver 104 that converts the electromagnetic waves to an electric current to power the device 108.

To apply a selective phase shift to each of plurality 114 of metamaterial elements 116, 118, a radiated field by transmitter 102 impinges on the metamaterial elements 116, 118 with phase $\varphi(i,j)$ for the ij-th element of array 112. Then, the phase of reflected waves 120, 122 by array 112 is $\varphi'(i,j)=\varphi(i,j)+\theta(i,j)$. Depending on the location of receiver 104, controller 124 applies a selective phase shift, adjusting $\theta(i,j)$ so that the reflected field is focused at receiver 104 after propagation through space. Controller 124 determines $\theta(i,j)$ by measuring the phase of a short signal 132 generated by receiver 104 periodically in time. If signal 132 by receiver 104 creates phases $\varphi_{Rx}(i,j)$ on metamaterial elements 116, 118, controller 128 adjusts the electrical signals so that $\theta(i,j)=-\varphi_{Rx}(i,j)-\varphi(i,j)$. Signal 132 generated by receiver 104 is at a slightly larger or lower frequency than transmitter 102 signal, to avoid interference between them.

For a given phase profile $\theta(i,j)$, controller 124 determines the voltages supplied to metamaterial array 112 through a lookup table, which is generated beforehand through numerical simulations of metamaterial elements with different values of variable capacitor 806. Applying a selective phase shift as described above allows for maximum focused power density at proximate location 116 of receiver 104. Receiver 104 may move throughout room 128, providing updated signals 132 to controller 128. Array 112 of plurality 114 of metamaterial elements 116, 118 will adjust phase based on updated signals 132 to shift maximum focused power density to new proximate location 116 of receiver 104.

The detailed description above focused on a rectangular room with impenetrable walls. The same method can also be applied to rooms of different shapes, as well as rooms with windows. In such a case, the metamaterial elements will be embedded in the windows by using metallic grids.

Figure 9:
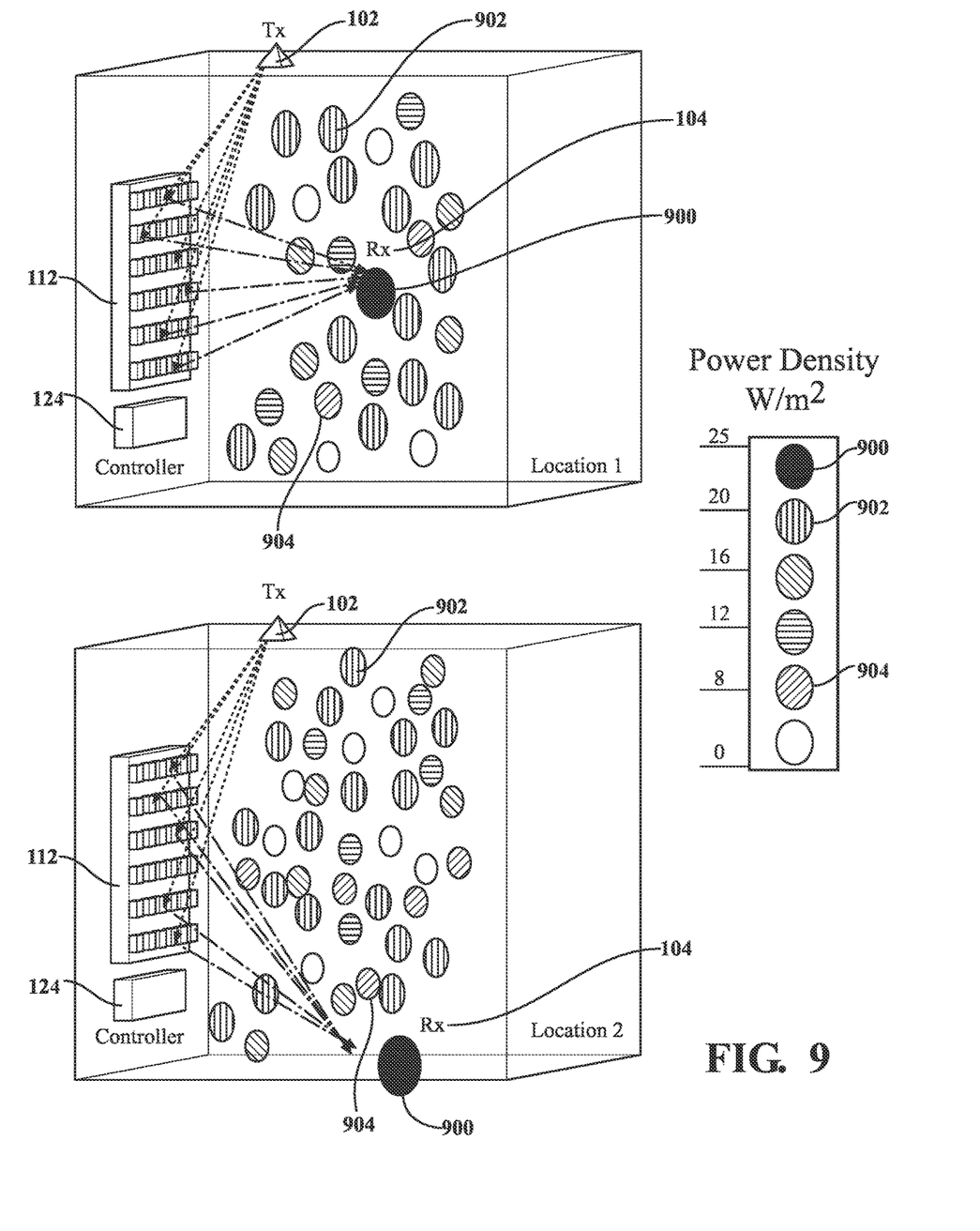
FIG. 9 illustrates power flow density in a room with the disclosed system in a first location and in a second location.

System 100 disclosed is designed to create a hot-spot 900 in proximate location 116 of receiver 104, but also creates a random distribution of hot-spots 902 throughout room 128. As illustrated in FIG. 9, controller 124 analyzes location signal 132 from receiver 104. Plurality 114 of metamaterial elements 116, 118 adjust the phase based on proximate location 116 of receiver 104 and transmit reflected waves 120, 122 focused onto receiver 104. While maximum power density is located at hot-spot 900, reflection of waves into room 128 results in the entire room 128 being active, and a receiver 104 may absorb power at any location in room 128.

Figure 10:
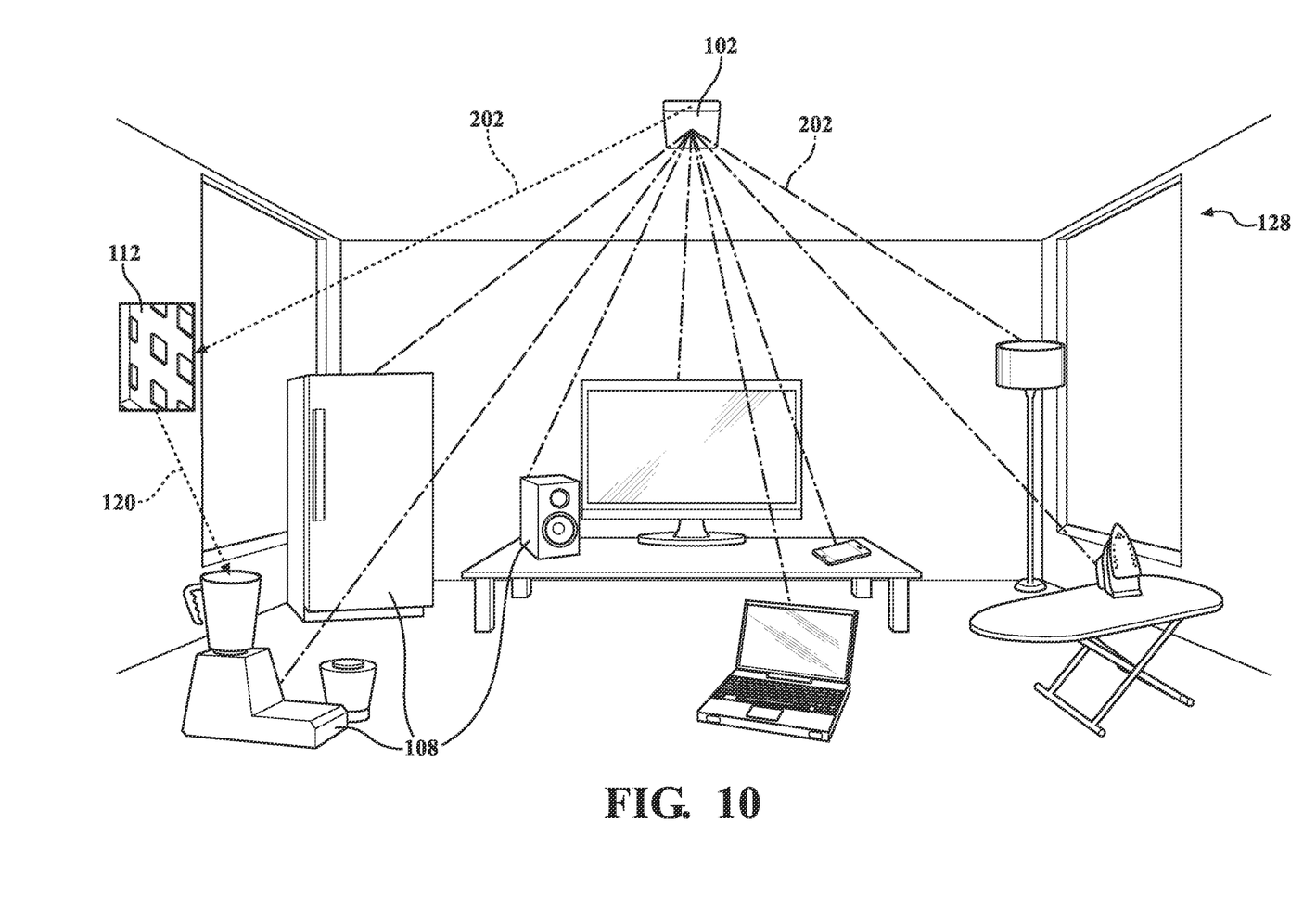
FIG. 10 illustrates intensity power transmission scenario in a room having multiple receiving devices.

While a focused hot-spot of power occurs at proximate location 116 of receiver 104, multiple hot-spots 902 occur around room 128. Multiple locations of high focused power density allow receiver 104 to be powered or charged over a larger area of space or to be moving around room 128 while still acquiring power from transmitter 102. FIG. 9 illustrates one receiver, but any number of receivers could be place in room 128, Multiple locations of high focused power density, allows multiple receivers to be powered or charged in room 128 simultaneously. As shown in FIG. 9, the power intensity at some locations may be high 902, while other locations may be lower 904. However, entire room 128 may be considered active. Adjusting the phase of plurality 114 of metamaterial elements 116, 118 changes the locations of hot spots throughout room 128. Therefore, system 100 allows for a device to move throughout room 128 and still be connected to power even if it is not located at hot-spot 900 in room 128. System allows for array 112 of plurality 114 of metamaterial elements 116, 118 to adjust the location of maximum power density 900 based on receiver 104 moving throughout room. FIG. 10 illustrates how power from transmitter 102 may be distributed to a plurality of devices 108, allowing room 128 of IoT devices to be connected and powered at the same time. Incident waves 202 sent from transmitter 102 may be absorbed by any number of receivers 104 in a plurality of devices 108 located in room 128. Incident waves 202 are illustrated transmitting directly to devices 108, but it is noted that any connected device 108 may utilize array 112 of plurality 114 of metamaterial devices 116, 118 to enhance received power via reflected waves 120.

According to the disclosure, a system that provides power to a device includes a transmitter that provides electrical power through electromagnetic waves, a receiver, an array that includes a plurality of metamaterial elements, such that the electrical power passes wirelessly from the transmitter to the array, and a controller that applies selective phase shifts to each of the plurality of metamaterial elements such that the electrical power is transmitted from the transmitter, reflected off the array, and is received in phase at the receiver that converts the electromagnetic waves to an electric current to power the device.

According to another aspect, a method of providing power to a device includes positioning a transmitter that provides electrical power through electromagnetic waves at a location, positioning a receiver at a location, positioning an array that includes a plurality of metamaterial elements proximate the location, such that the electrical power passes wirelessly from the transmitter to the array, and positioning a controller proximate the array that applies selective phase shifts to each of the plurality of metamaterial elements such that the electrical power is transmitted from the transmitter, reflected off the array, and is received in phase at the receiver that converts the electromagnetic waves to an electric current to power the device.

According to another aspect, a device for reflecting electrical power to a receiver that includes an array including a plurality of metamaterial elements and a controller that applies a selective phase shift to each of the plurality of metamaterial elements, such that the electrical power is reflected off the array and is received in phase at a receiver to power a device.

While embodiments of the invention have been described, it is not intended that these embodiments illustrate and describe all possible forms of the invention. Rather, the words used in the specification are words of description rather than limitation, and it is understood that various changes may be made without departing from the spirit and scope of the invention.

When introducing elements of various embodiments of the disclosed materials, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While the preceding discussion is generally provided in the context of providing wireless power to a device in an enclosed room it should be appreciated that the present techniques are not limited to such contexts. The provision of examples and explanations in such a context is to facilitate explanation by providing instances of implementations and applications. The disclosed approaches may also be utilized in other contexts, such as charging devices, charging electric vehicles, powering or charging devices in a home, and powering or charging devices in an open space.

While the disclosed materials have been described in detail in connection with only a limited number of embodiments, it should be readily understood that the embodiments are not limited to such disclosed embodiments. Rather, that disclosed can be modified to incorporate any number of variations, alterations, substitutions, or equivalent arrangements not heretofore described, but which are commensurate with the spirit and scope of the disclosed materials. Additionally, while various embodiments have been described, it is to be understood that disclosed aspects may include only some of the described embodiments. Accordingly, that disclosed is not to be seen as limited by the foregoing description but is only limited by the scope of the appended claims.

What is claimed is:

1. A system that provides power to a device, comprising:
   a transmitter that provides electrical power through electromagnetic waves;
   a receiver;
   an array that includes a plurality of metamaterial elements, such that the electrical power passes wirelessly from the transmitter to the array; and
   a controller that applies selective phase shifts to each of the plurality of metamaterial elements such that the electrical power is transmitted from the transmitter, reflected off of the array, and is received in phase at the receiver that converts the electromagnetic waves to an electric current to power the device.

2. A system of claim 1, wherein the transmitter, the receiver, and the array of metamaterial elements are positioned in an enclosed room.

3. A system of claim 1, wherein the receiver absorbs at least some of the electrical power transmitted by the transmitter and scatters the rest of the electrical power.

4. A system of claim 1, wherein the receiver transmits a pilot signal to the transmitter to begin transmission of electrical power.

5. A system of claim 1, wherein the receiver transmits a proximate location of the receiver to the controller, such that the controller applies a selective phase shift to the metamaterial elements for optimal reflection of electrical power to the proximate location of the receiver.

6. A system of claim 1, wherein the transmitter provides electrical power through electromagnetic waves to a plurality of receivers, such that a plurality of devices receive power.

7. A method of providing power to a device, comprising:
   positioning a transmitter that provides electrical power through electromagnetic waves at a location;
   positioning a receiver at a location;
   positioning an array that includes a plurality of metamaterial elements proximate the location, such that the electrical power passes wirelessly from the transmitter to the array; and positioning a controller proximate the array that applies selective phase shifts to each of the plurality of metamaterial elements such that the electrical power is transmitted from the transmitter, reflected off the array, and is received in phase at the receiver that converts the electromagnetic waves to an electric current to power the device.

8. The method of claim 7, wherein positioning at least one of the transmitter, the receiver, and the array further comprises positioning in an enclosed room.

9. The method of claim 7, wherein positioning the receiver further comprises absorbing at least some of the electrical power from the transmitter and scattering the rest of the electrical power.

10. The method of claim 7, wherein positioning the receiver further comprises sending a pilot signal to the transmitter to begin transmitting electrical power.

11. The method of claim 7, wherein positioning the receiver further comprises transmitting the location of the receiver to the controller, such that the controller adjusts the phase shift of the metamaterial elements for optimal reflection of electrical power to the location of the receiver.

12. The method of claim 11, wherein transmitting the location of the receiver to the controller, further comprises applying a selective phase shift to the metamaterial elements such that the metamaterial elements reflect electromagnetic waves to be in phase at the location of the receiver.

13. The method of claim 12, wherein applying a selective phase shift to the metamaterial elements further comprises controlling the metamaterial elements through voltages being supplied by the controller.

14. A device for reflecting electrical power to a receiver, comprising:
an array that includes a plurality of metamaterial elements; and
a controller that applies a selective phase shift to each of the plurality of metamaterial elements, such that electrical power is reflected off the array and is received in phase at a receiver to power the device.

15. A device of claim 14, wherein the receiver transmits a location of the receiver to the controller to apply the selective phase shift to each of the plurality of metamaterial elements for optimal reflection of electrical power to the receiver.

16. A device of claim 14, wherein the array further comprises a two-dimensional array of antennas.

17. A device of claim 16, wherein the two-dimensional array of antennas further comprises a metallic patch antenna on top of a dielectric surface.

18. A device of claim 17, wherein the metallic patch antenna further comprises a variable capacitor controlled by an electrical signal generated by the controller.

19. A device of claim 18, wherein the variable capacitor is linked from the metallic patch antenna to the dielectric surface.

20. A device of claim 18, wherein the variable capacitor is linked from a first metallic patch antenna to a second metallic patch antenna.

* * * * *